United States Patent
Shaw et al.

(10) Patent No.: US 7,103,520 B1
(45) Date of Patent: Sep. 5, 2006

(54) METHODS AND APPARATUS FOR MODEL BASED SHROUDED BELLOWS STIFFNESS DETERMINATIONS

(75) Inventors: Mark Richard Shaw, Loveland, OH (US); Christen Staton Vonderau, Beavercreek, OH (US)

(73) Assignee: General Electric Company, Schenectady, NY (US)

( * ) Notice: Subject to any disclaimer, the term of this patent is extended or adjusted under 35 U.S.C. 154(b) by 683 days.

(21) Appl. No.: 09/652,097

(22) Filed: Aug. 31, 2000

(51) Int. Cl.
*G06G 7/50* (2006.01)
*G06F 17/50* (2006.01)
*G01N 9/24* (2006.01)
*G06G 7/48* (2006.01)

(52) U.S. Cl. .................. 703/9; 703/1; 703/7; 703/9; 73/622

(58) Field of Classification Search .............. 703/9, 703/1, 7; 73/622
See application file for complete search history.

(56) References Cited

U.S. PATENT DOCUMENTS

| | | | | |
|---|---|---|---|---|
| 4,480,480 A | * | 11/1984 | Scott et al. | 73/769 |
| 4,860,564 A | * | 8/1989 | Kaplan | 72/14.4 |
| 5,253,528 A | * | 10/1993 | Varterasian et al. | 73/582 |
| 5,286,071 A | * | 2/1994 | Storage | 285/226 |
| 5,611,577 A | * | 3/1997 | Meyer et al. | 285/226 |
| 5,686,667 A | * | 11/1997 | McCollum et al. | 75/579 |
| 6,023,980 A | * | 2/2000 | Owen | 73/579 |

FOREIGN PATENT DOCUMENTS

| | | | | |
|---|---|---|---|---|
| WO | PCT-US91/04323 | * | 4/1992 | 345/157 |
| WO | US91/04323 | | 4/1992 | 345/157 |

OTHER PUBLICATIONS http://www.algor.com/products/ALGNAS1735/default.asp See In re Epstein p. 1-7 (printed).*
Rosemount. "Pressure Fundamentals and Transmitter Selection" Technical Data Sheet pp. 1-14. 1998.*
Broman-G et al. "Modeling Flexible Bellows by Standard Beam Finite Elements" University of Kariskrona/Fonneby 1999 pp. 1-45.*
Maker et al., "NIKE3D A Nonlinear, Implict, Three-Dimensional Finite Element Code For Solid and Structural Mechanics User's Manual" 1995. approx. 134 pages.*
Derwent-Week: 197746 abstract, p. 1.*

* cited by examiner

*Primary Examiner*—Anthony Knight
*Assistant Examiner*—Tom Stevens
(74) *Attorney, Agent, or Firm*—William Scott Andes; Armstrong Teasdale LLP

(57) ABSTRACT

A modeling system predicts natural frequency responses in tube sub-systems including shrouded bellows components. The system determines a stiffness multiplier from input values and uses the determined flexibility factor to determine the natural frequency responses. The input values include geometry inputs and dynamic operating condition inputs. The flexibility factor is determined with a regression equation. The regression equation, based on dynamic stiffness test data of various shrouded bellows configurations, permits the system to characterize the shrouded bellows using a geometry element that includes an assigned flexibility factor based on dynamic stiffness test data.

10 Claims, 3 Drawing Sheets

METHODS AND APPARATUS FOR MODEL BASED SHROUDED BELLOWS STIFFNESS DETERMINATIONS

BACKGROUND OF THE INVENTION

This invention relates generally to shrouded bellows and, more particularly, to modeling techniques used to predict natural frequency responses in tube systems that include shrouded bellows.

Shrouded bellows or sealed ball joints are often used in gas turbine engine ducting systems to connect adjacent sections of fluid carrying tubing which require articulation therebetween. The shrouded bellows provide a flexible joint that prevents leakage of the fluid flowing therethrough despite potential movement between the adjacent sections of tubing. Such movement can be for example, caused as a result of thermal growth in the ducting system during engine operation.

Shrouded bellows are typically located in various locations within and around the engine. To design shrouded bellows and associated hardware to withstand High Cycle Fatigue (HCF) stresses, modeling techniques are used to predict natural frequency responses in the ducting systems including the shrouded bellows components. Known modeling techniques use analytical models that approximate shrouded bellows natural frequency response with manufacturer-supplied test data. Such test data is typically obtained from static stiffness component testing. The analytical models incorporate static stiffness data by assigning a spring constant to various spring elements used to represent the shrouded bellows within the analytical models. The spring elements provide the bellows stiffness input for an analytical determination of the system natural frequency response. Because the shrouded bellows natural frequency response is based on static stiffness test data, the ability of the analytical models to accurately estimate the natural frequency response of shrouded bellows is potentially limited.

BRIEF SUMMARY OF THE INVENTION

In an exemplary embodiment, a modeling system accurately predicts natural frequency responses in tube sub-systems that include shrouded bellows components. The modeling system characterizes the shrouded bellows using a standard geometry element that includes an assigned stiffness multiplier based on dynamic stiffness component data rather than static stiffness component test data. In the exemplary embodiment, the modeling system characterizes the shrouded bellows using a standard geometry element that is a tube element that includes an applied flexibility factor, and the modeling system determines the flexibility factor using regression techniques. An exemplary regression equation accounts for tube system diameter, bellows pitch, system operating pressure, and dynamic system operating input. The modeling system facilitates accurate predictions of natural frequency responses in tube sub-systems that include shrouded bellows components in a cost effective and reliable manner.

DETAILED DESCRIPTION OF THE INVENTION

Figure 1:
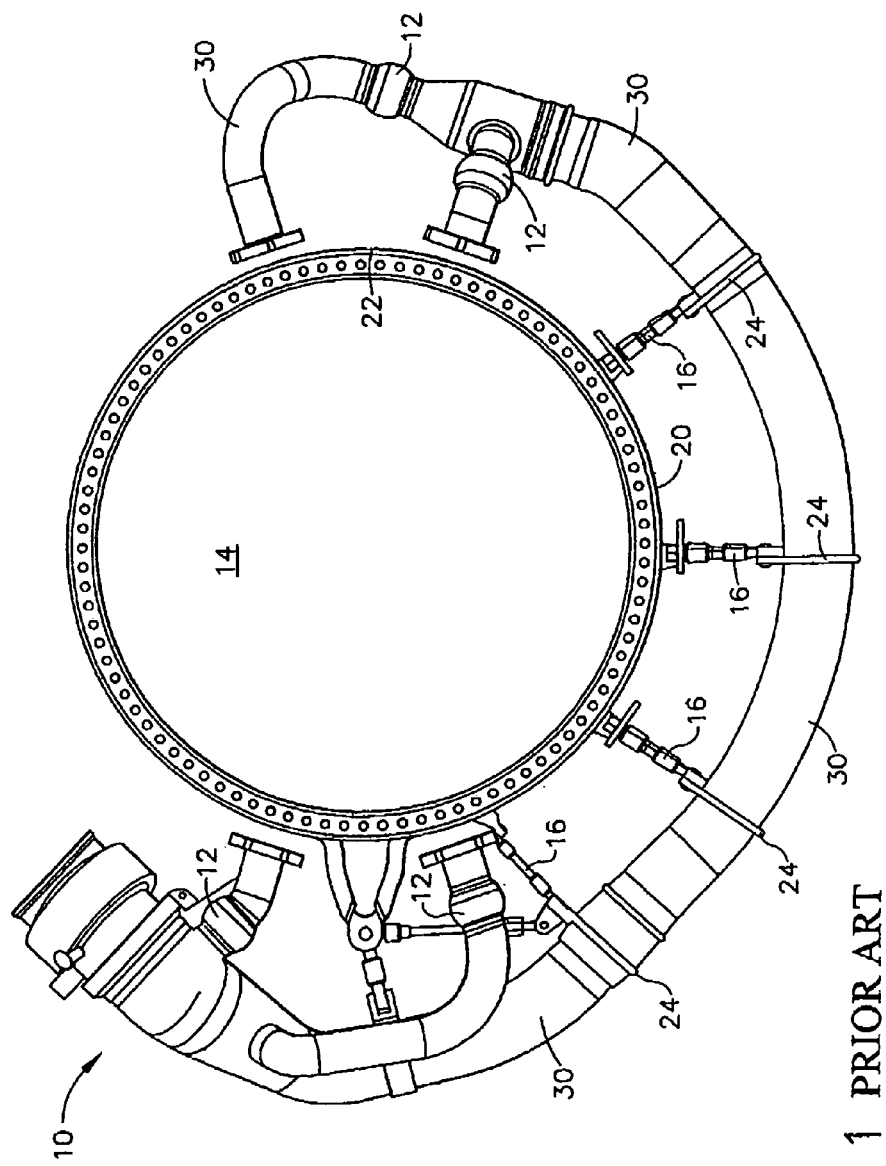
FIG. 1 is a front schematic illustration of a tube sub-system including a plurality of shrouded bellows.

FIG. 1 is a front schematic illustration of a tube sub-system 10 including a plurality of shrouded bellows 12. Tube sub-system 10 is attached radially outwardly from a gas turbine engine 14 with a plurality of rod end links 16. Rod end links 16 extend radially outward from an outer surface 20 of an engine casing 22. Each rod end link 16 includes a circular strap 24 for securing to tube sub-system 10.

Tube sub-system 10 includes a plurality of tubing sections 30 connected together to form a flow passageway. Each rod link strap 24 secures to one of tubing sections 30 and secures such tubing section 30 to engine casing 22. Each shrouded bellow 12, described in more detail below, is connected in flow communication between adjacent tubing sections 30 and provides a flexible joint that has substantially leak-proof angulation between adjacent sections of tubing 30. Furthermore, bellows 12 provide flexibility for tube sub-system 10 which may be required in order to physically deflect tubing sections 30 so as to improve installation ease with other components (not shown) of engine 14 and to accommodate thermal growth of tubing sections 30 during engine operation.

Figure 2:
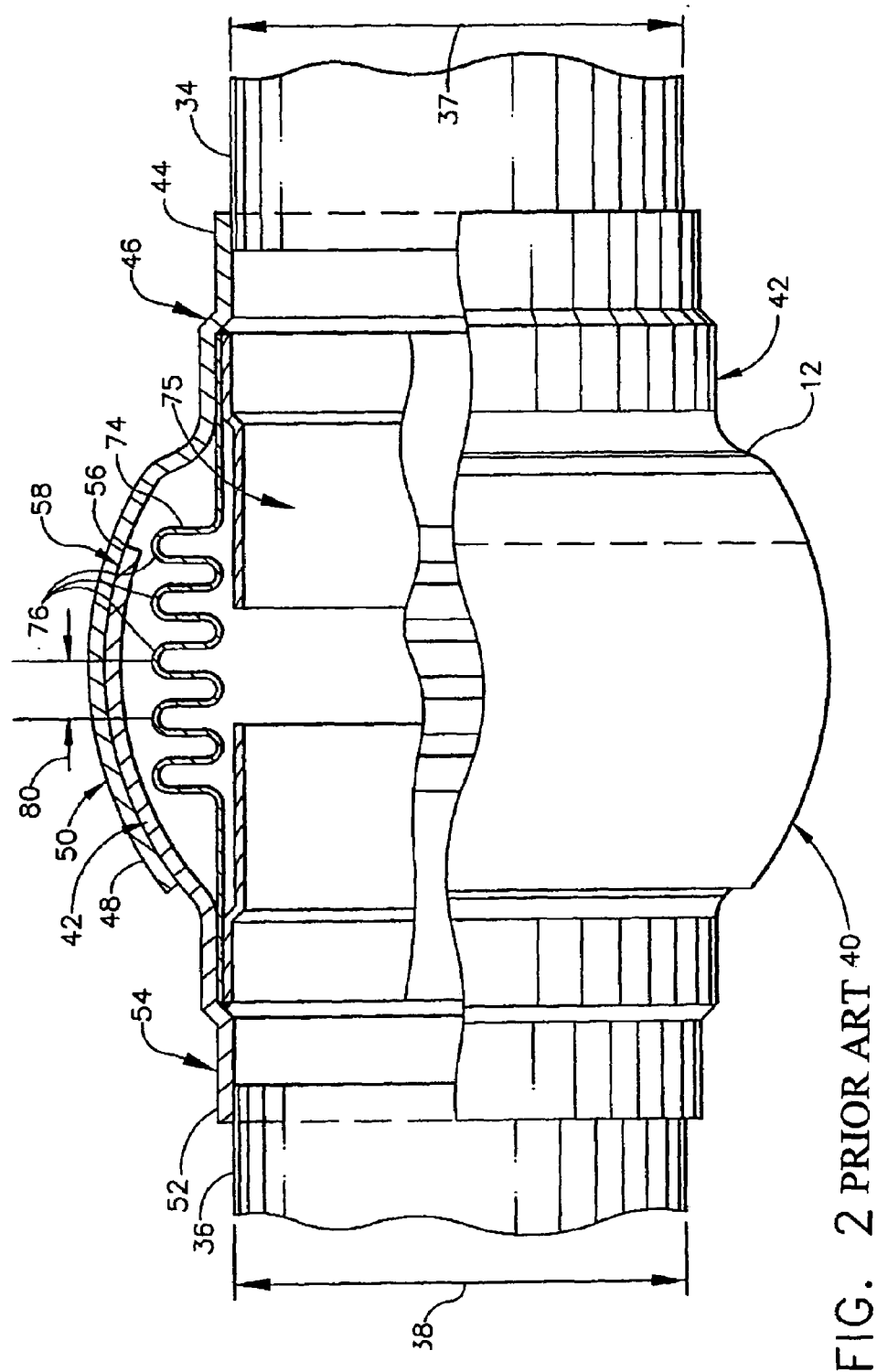
FIG. 2 is a partially cut-away side view of a shrouded bellow used with the tube sub-system shown in FIG. 1.

FIG. 2 is a partially cut-away side view of shrouded bellows 12 used to join a first tube 34 in flow communication with a second tube 36. Shrouded bellows 12 prevents leakage of fluid between adjacent tubes 34 and 36 while providing pivotal or articulated movement between tubes 34 and 36. First tube 34 has a first diameter 37 and second tube 36 has a second diameter 38.

Shrouded bellow 12 includes a tubular outer shroud 40 which surrounds in part a coaxial tubular inner shroud 42. Outer shroud 40 is one piece and includes at a first end 44, an integral cylindrical sleeve 46 for attaching to first tube 34. Shroud 40 also includes at a second end 48, an integral spherical concave annulus 50.

Inner shroud 42 includes at a first end 52 a cylindrical sleeve 54 for attaching to second tube 36. Shroud 42 includes at a second end 56 an integral spherical convex annulus 58. An outer diameter (not shown) of convex annulus 58 is approximately equal an inner diameter (not shown) of concave annulus 50 such that inner shroud convex annulus 58 is in slidable contact with outer shroud concave annulus 50.

A tubular bellows 74 is coaxial with a center axis of inner and outer shrouds (not shown). Bellows 74 is between inner shroud 42 and a bellows liner 75, permitting first and second pieces of tubing 34 and 36, respectively, to sealingly join while permitting limited pivotal movement therebetween. Bellows 74 include a plurality of axially spaced apart convolutions 76 that provide a flexible seal between inner and outer shrouds 42 and 40, respectively. Corresponding portions of adjacent convolutions 76 define a pitch 80 for bellows 74.

Figure 3:
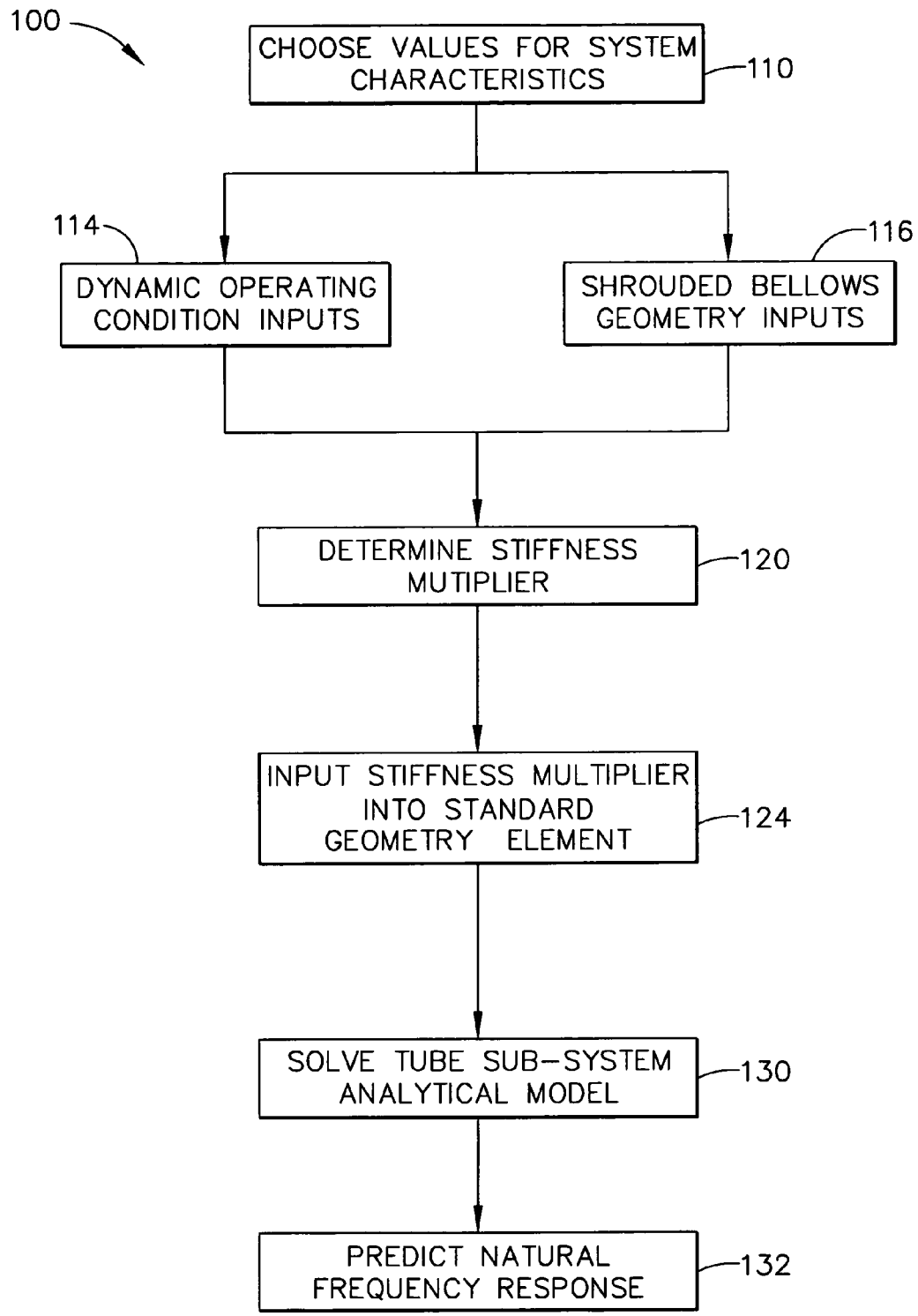
FIG. 3 is a flowchart of a method for modeling natural frequency responses in tube sub-systems such as the tube sub-system shown in FIG. 1.

FIG. 3 is a flowchart 100 of a method for modeling natural frequency responses in tube sub-systems, such as tube sub-system 10 (shown in FIG. 1), that include shrouded bellows 12 (shown in FIGS. 1 and 2). The method can be practiced on a computer (not shown), such as a personal computer or a workstation, including an interface (not shown), such as a keyboard and an a display, a processor, and a memory.

Initially, input values are chosen 110 that are indicative of tube sub-system characteristics. More specifically, values for dynamic operating condition inputs 114 and shrouded bellows geometry inputs 116 are selected. In the exemplary embodiment, dynamic operating condition inputs 114 include at least data representing an operating pressure and vibratory environment of tube sub-system 10 (shown in FIGS. 1 and 2) and shrouded bellows geometry inputs 116 include data representing bellows pitch 80 (shown in FIG. 2) and bellows mating tube diameters 37 and 38 (shown in FIG. 2). Such inputs 114 and 116 are, for example, selected by an operator.

A stiffness multiplier for tube sub-system 10 being analyzed is then determined 120. Instead of modeling shrouded bellows 12 (shown in FIGS. 1 and 2) as spring elements including an assigned spring constant that is based on static stiffness component test data, shrouded bellows 12 is characterized using a standard geometry element that includes an assigned stiffness multiplier based on dynamic stiffness component test data. The stiffness multiplier is a finite element input that may be selectively adjusted to customize a dynamic stiffness of a particular shrouded bellows element. The stiffness multiplier is determined 120 with a regression equation that accounts for tube sub-system diameter 37 and 38, system operating pressure, bellows pitch 80, and dynamic system operating inputs.

The regression equation is based on dynamic stiffness test data obtained as a result of testing several different shrouded bellows configurations. Each different shrouded bellows configuration can be analytically modeled to determine a unique stiffness multiplier for that specific shrouded bellows configuration and to generate a tube sub-system analytical model. The stiffness multiplier regression equation may used for a broad range of tube sub-system sizes and operating conditions reflective of the dynamic stiffness test data upon which the modeling was based. Within the tube sub-system analytical model, the appropriate stiffness multiplier is input 124 to the standard geometry bellows element.

In the exemplary embodiment, shrouded bellows 12 are characterized using a standard geometry element that is a tube element that includes a stiffness multiplier that is an applied flexibility factor. The flexibility factors were determined using an iterative scheme that optimized the flexibility factors by matching the natural frequency responses of the tube elements in a finite element analysis to the natural frequency responses of vibratory component tests. The flexibility factors assigned to the standard tube elements were varied incrementally until the analytical natural frequency response of the bellows element equaled the natural frequency response of the bellows test component. For example, in one embodiment, a three inch diameter shrouded bellows centered on a twelve inch cantilevered straight tube section (not shown) within a system pressurized to approximately 100 psia in an approximately constant 2 g vibratory environment, produced a natural frequency response of 166 Hz. The test component was modeled using finite element analysis to determine that assigning a flexibility factor of approximately 0.328, enabled the analytical model to yield the same natural frequency response as the component test piece under the approximate same operating conditions.

The tube sub-system analytical model is then solved 130 to determine or predict 132 a tube sub-system natural frequency response. As a result, because more accurate estimates of shrouded bellows dynamic response are facilitated, shrouded bellows tube sub-systems may be designed more reliably.

In one embodiment, tube sub-system is a CF34-8 aircraft engine cooling system (not shown) available from General Electric Aircraft Engines, Cincinnati, Ohio and the tube system natural frequency responses of the CF34-8 aircraft engine cooling system are predicted 132. A regression equation uses vibratory environment inputs 114, operating pressures 114, tube system diameters 37 and 38, and bellows pitch information 80 to determine 120 flexibility factors for bellows elements 12 included in the CF34-8 aircraft engine duct system. The regression equation determines 120 the flexiblity factors to be assigned to tube bellows elements. Solving the finite element analysis provides the natural frequency response of the CF34-8 aircraft engine duct system for a specified engine vibratory environment. The resulting natural frequency response facilitates determining locations for duct supports.

The above-described modeling method is cost-effective and accurate. The modeling method simulates and predicts a stiffness of shrouded bellows through the use of a regression equation. The regression equation, based on dynamic stiffness test data of a plurality of shrouded bellows configurations, permits the shrouded bellows to be characterized using a standard geometry element that includes an assigned stiffness multiplier based on the dynamic stiffness test data. As a result, the modeling method permits predictions of natural frequency responses in tube sub-systems that include shrouded bellows components in a cost effective and reliable manner.

While the invention has been described in terms of various specific embodiments, those skilled in the art will recognize that the invention can be practiced with modification within the spirit and scope of the claims.

What is claimed is:

1. A computer-implemented method for predicting natural frequency responses, said method comprising the steps of:
   providing at least one tube sub-system including a plurality of shrouded bellows components;
   determining a stiffness multiplier within each of the shrouded bellows components using a regression technique based on dynamic stiffness test data;
   inputting the determined stiffness multiplier into a computer model that applies a standard geometry element and a flexibility factor based upon the stiffness multiplier to predict a natural frequency response; and
   determining locations for duct supports based on the natural frequency response.

2. A method in accordance with claim 1 further comprising the step of inputting dynamic system operating inputs into the model.

3. A method in accordance with claim 2 wherein said step of inputting dynamic system operating inputs further comprises the step of inputting at least an operating pressure and vibratory environment into the model.

4. A method in accordance with claim 2 further comprising the step of inputting geometry inputs including at least one of a bellows pitch and a mating tube diameter into the model.

5. A method in accordance with claim 3 further comprising the step of determining the stiffness of the at least one tube sub-system as a function of the stiffness multiplier.

6. Apparatus for determining natural frequency response of shrouded bellows components, said apparatus comprising a processor configured to:
   determine a stiffness multiplier within the shrouded bellows components using a regression technique based on dynamic stiffness test data;
   use the determined stiffness multiplier in a model that applies a standard geometry element and a flexibility factor based upon the stiffness multiplier to predict a natural frequency response of the bellows; and
   determine a location of a duct support based on the natural frequency response.

7. Apparatus in accordance with claim 6 wherein said model is configured to utilize shrouded bellows geometry inputs and dynamic operating condition inputs to determine the stiffness multiplier.

8. Apparatus in accordance with claim 7 wherein the bellows geometry inputs include at least one of a tube sub-system diameter and a bellows pitch.

9. Apparatus in accordance with claim 7 wherein the dynamic operating condition inputs include at least an operating pressure.

10. Apparatus in accordance with claim 6 wherein the stiffness multiplier is adjustable such that a dynamic stiffness of the shrouded bellows is selectively variable.

* * * * *

UNITED STATES PATENT AND TRADEMARK OFFICE
CERTIFICATE OF CORRECTION

PATENT NO. : 7,103,520 B1  Page 1 of 1
APPLICATION NO. : 09/652097
DATED : September 5, 2006
INVENTOR(S) : Shaw et al.

It is certified that error appears in the above-identified patent and that said Letters Patent is hereby corrected as shown below:

In Claim 1, column 4, line 44, delete "comprising the steps" and insert therefor -- comprising steps --.
In Claim 2, column 4, line 58, between "the" and "model" insert -- computer --.
In Claim 3, column 4, line 62, between "the" and "model" insert -- computer --.
In Claim 4, column 4, beginning on line 66, between "the" and "model" insert -- computer --.

Signed and Sealed this

Twenty-seventh Day of November, 2007

JON W. DUDAS
*Director of the United States Patent and Trademark Office*